United States Patent
Deliwala et al.

(10) Patent No.: US 8,265,609 B2
(45) Date of Patent: Sep. 11, 2012

(54) SYSTEM, METHOD AND COMPUTER PROGRAM PRODUCT FOR PROVIDING CUSTOMER SERVICE ON A MOBILE DEVICE

(75) Inventors: Manish K. Deliwala, Chander, AZ (US); Brett A. Vedas, Tempe, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 242 days.

(21) Appl. No.: 12/686,048

(22) Filed: Jan. 12, 2010

(65) Prior Publication Data

US 2011/0171939 A1   Jul. 14, 2011

(51) Int. Cl.
*H04M 3/42* (2006.01)

(52) U.S. Cl. ............. 455/414.1; 455/412.2; 455/413; 455/556; 455/550.1; 455/418; 370/259; 370/270; 379/157; 379/158

(58) Field of Classification Search ............. 455/414.1, 455/412.2, 413, 566, 550.1, 418; 370/259, 370/270; 379/157, 158
See application file for complete search history.

(56) References Cited

U.S. PATENT DOCUMENTS

| | | | |
|---|---|---|---|
| 2004/0078388 A1* | 4/2004 | Melman | 707/104.1 |
| 2007/0189267 A1* | 8/2007 | Metcalf et al. | 370/352 |
| 2008/0004880 A1 | 1/2008 | Acero et al. | |
| 2009/0019061 A1* | 1/2009 | Scannell, Jr. | 707/10 |
| 2009/0142036 A1* | 6/2009 | Branam et al. | 386/83 |
| 2009/0286514 A1* | 11/2009 | Lichorowic et al. | 455/412.2 |
| 2010/0003954 A1 | 1/2010 | Greene et al. | |
| 2012/0077470 A1* | 3/2012 | Kim et al. | 455/414.1 |

OTHER PUBLICATIONS

PCT: International Search Report and Written Opinion dated Mar. 17, 2011 in Application No. PCT/US2011/020738.

* cited by examiner

*Primary Examiner* — Ajit Patel
*Assistant Examiner* — Khai M Nguyen
(74) *Attorney, Agent, or Firm* — Snell & Wilmer L.L.P.

(57) ABSTRACT

A system, method, and computer program product for providing customer services on a mobile device can provide a user-interface on a mobile device to display one or more customer service options, store state information of the customer's interaction with the user-interface, and provide a user-interface element that provides the customer an option to contact a customer service agent. In response to the customer's exercising the option to contact the customer service agent, the stored state information is sent to the customer service agent.

15 Claims, 7 Drawing Sheets

SYSTEM, METHOD AND COMPUTER PROGRAM PRODUCT FOR PROVIDING CUSTOMER SERVICE ON A MOBILE DEVICE

BACKGROUND OF THE INVENTION

1. Field of the Invention

The present invention generally relates to the field of providing customer service, and more particularly to a method and a system for providing customer service to a customer using a mobile device.

2. Related Art

Many business entities provide customer support services to ensure higher customer satisfaction. Indeed, certain business entities sometimes differentiate themselves from competition by having a better customer support service. Usually, business entities establish customer service centers to provide customer support services. A typical customer service center hosts a number of customer service agents (CSAs) to assist customers with their requests and queries. The business entities advertise their customer service numbers to the customers, which allows the customers to contact the customer service centers.

However, it is often expensive to maintain customer service centers. Further, many customers require support for routine queries or tasks, which do not necessarily require a human CSA. Therefore, many business entities augment their customer support services with self-service options for customers. The self-service options may include, for example, Interactive Voice Response (IVR) systems, customer service web portals, and mobile device based applications (or mobile applications).

Typically, when a customer calls the customer service center, the customer is directed to an IVR system. The IVR system guides the customer through a process of self-servicing. Before self-servicing, the IVR system may optionally require the customer to go through an authentication process. In the authentication process the customer may be asked to provide his or her information, such as a personal identification number (PIN), social security number, date of birth, and the like. After successful authentication, the IVR system offers a variety of customer servicing options. For example, for a credit card customer, the customer servicing options may include making an inquiry about the account summary, transaction details, outstanding balance, payment due date, line of credit, and the like. Further, the IVR system may also provide the customer an option to speak with a CSA in case the customer is not able to self-service satisfactorily.

In IVR systems, when the customer exercises the option to speak with a CSA, the IVR system transfers the customer's call to a customer service center. Further, the IVR system sends the customer's state information to the customer service agent. The customer's state information includes details of the customer's self-servicing interactions with the IVR system. For example, state information may include the customer service options that the customer selected in the session, the last customer service option selected before deciding to speak with a customer service agent, and so on. This provides the CSA context about the task that the customer is trying to accomplish, thereby helping the CSA support the customer more efficiently. Along with the state information, the IVR system may further inform the CSA that the customer has already been authenticated by the IVR system, so that the CSA does not repeat the authentication process. Such sharing of information between the IVR system and the CSA provides for efficient processing of CSA requests, leading to greater customer satisfaction and reduced cost of maintaining the customer service center.

Besides IVR systems that allow customers to self-service, mobile applications allow a customer to self-service their requests or queries using an interface on a mobile device. Mobile applications for self-servicing may be native applications residing on the mobile devices that communicate with the business entity's database over a network. Alternatively, the business entity may offer a Wireless Application Protocol (WAP) based self-service interface that customers can access from a WAP browser on their mobile device. Mobile applications have gained popularity and proven to be cost-effective. A customer may use the mobile application to authenticate himself or herself, and use the self-servicing options provided by the mobile application. In the case the customer finds the self-servicing options in the mobile application insufficient to address his or her request or query satisfactorily, he or she may choose to call a CSA through an advertised customer service contact number. Upon calling the customer service contact number, the customer is usually required to re-authenticate himself or herself. In addition, the customer is often directed to an IVR system that has similarly insufficient self-servicing options as the mobile application. After navigating the IVR system, when the customer finally speaks with a CSA, he or she often needs to restate his or her requirement to the CSA. This leads to a waste of the customer's time and proves inefficient for the business entity.

Given the foregoing, what is needed is a system, a method, and a computer program product for providing customer service through mobile applications in a convenient and effective manner.

BRIEF DESCRIPTION OF THE INVENTION

The present invention meets the above-identified needs by providing methods, systems, and computer program products for providing customer services on a mobile device of a customer in a convenient and cost-effective way. According to an embodiment of the present invention, an interface is provided on the mobile device to showcase one or more customer service options along with a "click to talk" option to contact a CSA, which is offered depending on one or more pre-defined conditions. A user can easily access the information and do self-servicing using the customer servicing options. If the user selects the "click to talk" option to contact a CSA, state information capturing the user's interaction with the customer servicing options is also passed to the customer service agent as a call is made to a CSA through a customer servicing call center. Various embodiments of the present invention provide the advantage of saving the cost associated with an IVR system by providing an interface on a mobile device by a native application. Another advantage is that a CSA is provided with the details of the customer's interactions from the state information beforehand. This gives the CSA enough time to prepare for assisting the customer and possibly have an answer to the customer's queries before taking the call from the customer. According to a further advantage, by providing a "click to talk" option on the interface of an application on the mobile device, the customer need not remember the customer service phone number. Also, once the "click to talk" option is exercised, the application is able to display an approximate wait time for the call to connect if a CSA is not immediately available. In a fast growing smart phone market, most customers may try to use their mobile devices for multiple purposes, including information retrieval. In this scenario, the above-described customer service system may provide the customer with an added advantage of receiving customer support services on a mobile device. The customer service system may enhance the customer satisfaction level, by providing him or her an option to directly call a customer service agent without an IVR system. Also, by making the customer's state information available to the agent, the customer service agent will be able to direct services and assistance towards the customer's state information.

In accordance with one embodiment of the present invention, there is provided a method for providing customer services on a mobile device of a customer. The method includes providing a user-interface on the mobile device of the customer to display one or more interactive customer service options. A native application provides the user-interface on the mobile device. The customer may interact with the provided one or more customer service options on the user-interface and perform self-servicing. The method further includes storing interaction state information of the customer's self-servicing on the mobile device. The method further includes displaying a user-interface element on the user-interface to provide an option to contact a customer service agent. In response to the customer exercising the option to contact the customer service agent, the mobile device sends the state information to the customer service agent.

In accordance with another embodiment of the present invention, there is provided a method for providing customer services to a customer. The method includes receiving a customer service request at a mobile data server from a mobile device of the customer. Then the mobile data server dynamically selects a contact number of a customer service agent and sends the contact number to the mobile device. In response to starting a call from the mobile device, the mobile data server provides state information associated with the customer service request to the customer service agent.

In accordance with yet another embodiment of the present invention, there is provided a computer program product having stored control logic for providing customer services on a mobile device of a customer. The control logic includes a first computer readable program code means for providing a user-interface on the mobile device of the customer. The user-interface displays one or more interactive customer service options. The interaction state information of the customer with the one or more customer service options is stored using a second computer readable program code means of the control logic. The control logic further includes a third computer readable program code means for displaying a user-interface element on the user-interface, the user-interface element provides the customer an option to contact a customer service agent. Whenever the customer exercises the option to contact the customer service agent, a fourth computer readable program code means is provided in the control logic for sending the stored state information to the customer service agent.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numerals indicate identical or functionally similar elements.

DETAILED DESCRIPTION OF THE PREFERRED EMBODIMENTS

I. Overview

The present invention is directed to a system, methods, and a computer program for providing customer service on a mobile device of a customer. A user-interface may be deployed on the mobile device using a native application specific to a service provider. The native application may be downloadable from a domain, which hosts the native application, and can be installed on the mobile device. The native application guides a customer through a registration process. The process may include entering customer identifiable information for certifying the customer and also choosing an access code. The customer identifiable information may vary from one service provider to another, depending on the type of services or products offered. Typically the customer identifiable information may include name, social security number, customer's relationship number with the service provider (account number), phone number, etc.

Every time the customer uses the native application authentication is required by entering or speaking an access code, phrase, or other information, which can be stored on the mobile device. Then, a user-interface displays one or more customer service options pertaining to the services or products offered by the service provider. Along with the one or more customer service options, depending on one or more pre-defined conditions, a "click to talk" option is provided on the user-interface. When a customer selects and clicks the "click to talk" option on the user-interface, the mobile device initiates a call to a CSA through a customer servicing call center. As the call is made to the customer servicing call center, state information associated with the customer's interaction is also received by the CSA.

In an embodiment, the present invention is for use with mobile devices, including smart phones (e.g., BlackBerry® devices, iPhones®, Palm® devices, or the like); touch sensitive devices using operating systems such as WindowsMobile; and phones using an operating system, which are able to display and execute a native application.

A "customer" or "user" is any entity, including an individual or a group of individuals, using a service or a product and seeking regular details, updates, and servicing related queries by interacting with a customer service center. One example of such entity is a credit card holder, or any card holder, that maintains a transaction account and requires customer service regarding the account using a mobile device.

II. System

The present invention is now described in terms of an exemplary system, hereinafter referred to as a "customer service system", in which the present invention, in one embodiment, would be implemented. This is for convenience only and is not intended to limit the application of the present invention. It will be apparent to one skilled in the relevant art(s) how to implement the present invention in alternative embodiments.

Various embodiments of the present invention may be deployed in different scenarios. In one exemplary scenario, a customer may attempt to access customer services using a mobile device.

Figure 1:
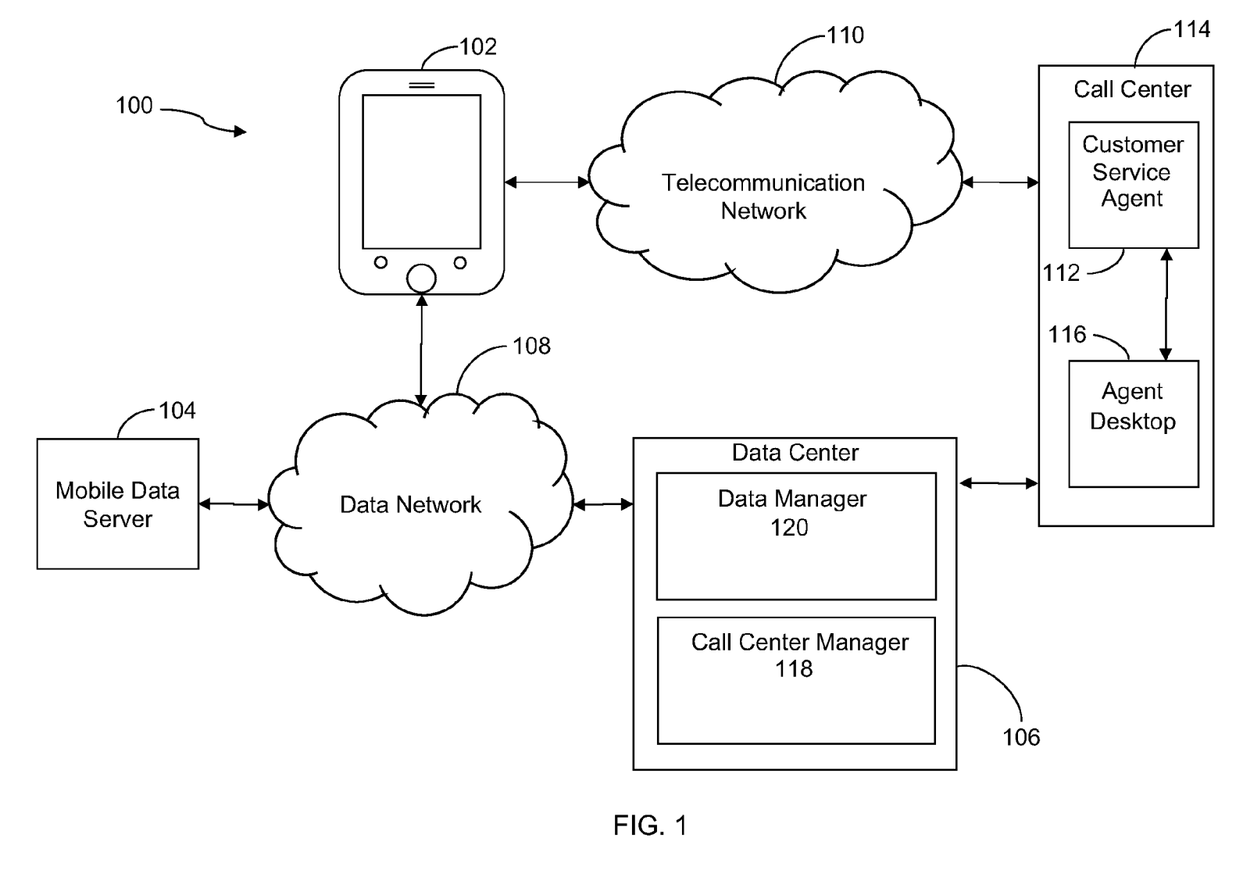
FIG. 1 is an exemplary system in which a customer service system may be deployed, according to one embodiment of the present invention.

FIG. 1 illustrates an exemplary system 100 in which a customer service system may be deployed, according to one embodiment of the present invention. The customer service system includes a mobile device 102 of a customer, a mobile data server 104, a data center 106, a data network 108, a telecommunication network 110, and a customer servicing call center 114 that transfers a call to a customer service agent 112. In an embodiment of the invention, mobile data server 104 is deployed by a service provider or a third party. The service provider may be, for example, a credit card service provider, a banking service provider, a product manufacturer, a third party service provider, and the like. Data network 108 provides a communication link between mobile data server 104 and mobile device 102 of the customer. Data network 108 provides voice and data communication capabilities. Data network 108 may include packet-based wide area networks (such as the Internet), local area networks (LANs), private networks, wireless networks, satellite networks, cellular networks, paging networks, and the like. A person skilled in the art will recognize that data network 108 may also be a combination of more than one type of network. For example, data network 108 may be a combination of a LAN and the Internet. In addition, data network 108 may be implemented as a wired network, a wireless network, or a combination thereof.

As illustrated in FIG. 1, data center 106 comprises a call center manager 118 and a data manager 120. Call center manager 118 manages the real time capacity of customer call center 114, determines which customer service agents 112 are free to take calls from mobile device 102, and determines an approximate wait time to reach customer service agent 112. In one embodiment of the invention, call center manager 118 provides continuous updates to mobile device 102 regarding the capacity of customer servicing call center 114 and the approximate wait time to reach customer service agent 112.

In various embodiments of the invention, a user-interface may be provided on mobile device 102 of the customer by a native application specific to the service provider or by using WAP browser application on mobile device 102. In an embodiment of the invention, the native application may be downloaded from the service provider website or from a third party domain associated with the service provider.

In various embodiments of the invention, data center 106 may initially register the customer at the first instance of accessing the user-interface on mobile device 102. The customer may be required to provide basic details at the time of registration. The basic details may vary upon the nature of the service provider. For example, in the case of a credit card service provider, customers are required to provide details such as, but not limited to, one or more of credit card number, expiry date, billing address, contact details, social security number, other customer identifiable information, and the like. However, once those details are provided, data center 106 may generate a password to authenticate the customer for future access to the user-interface. In an embodiment of the invention, the customer may choose a password and register the password with data center 106. Thus, requests subsequent to initial registration are authenticated by the generated password. A number of techniques for authentication of the customer using mobile device 102 are known in the art. It will be apparent to a person skilled in the art that any of these techniques may be used in conjunction with the present invention.

Again, referring to the FIG. 1, the user-interface provided on mobile device 102 is configured to display one or more customer service options to the customer. For example, in the case of a credit card customer, customer service options may include viewing an account summary, inquiring about a payment balance, line of credit, new account application, etc., which allow the customer to self-service his or her support needs. In one embodiment of the present invention, the user-interface displays the customer service options in a graphical user-interface (GUI) format and the customer accesses them by selecting and clicking on the desired option(s).

In response to the customer's interactions on the user-interface, the native application in mobile device 102 may communicate with data center 106 over data network 108. In various embodiments, the interactions on the user-interface may represent one or more requests from the customer. For example, in the case of a credit card customer, if the customer selects to view the account summary of his or her credit card on the user-interface, the native application may send a request to mobile data server 104. Subsequently, mobile data server 104 may interact with data center 106 over data network 108 to retrieve responses from data manager 120 for the request received from mobile device 102. In various embodiments of the invention, data center 106 may be deployed by the service provider or a third party. Data center 106 maintains customer specific information in data manager 120. For example, in the case of a credit card service provider, data manager 120 may include customer names, account numbers, account history, transaction details, telephone numbers, passwords, or the like. The service provider or the third party may dynamically update data manager 120 and organize customer specific information for easy retrieval and processing.

Mobile data server 104 may receive the response of the request from data manager 120. Subsequently, mobile data server 104 sends the responses to mobile device 102, which displays the response of the customer's request on the user-interface. For example, if a credit card customer requested to see a payment due amount, mobile data server 104, on receiving the request from the native application residing on mobile device 102, may interact with data center 106 of the credit card company server (that is the service provider) to retrieve the responses and subsequently display the payment due amount on the user-interface.

In an embodiment of the present invention, the native application stores the various customer's interactions, such as, but not limited to, customer service options accessed by the customer, responses to one or more customer's requests received from data manager 120, responses deployed on the user-interface, and the like on mobile device 102. The stored information is hereinafter interchangeably referred to as state information. In various embodiments, the state information may include self-servicing details of the customer on the user-interface. For example, in the case the service provider is a credit card company, the state information may include that the customer has selected account summary and payment balance enquiry options on the user-interface and the state information may also include the corresponding details on the account summary and payment balance displayed to the customer.

Further, the native application may also display a user-interface element, which provides the customer an option to contact a customer service agent. In various embodiments of the invention, the user-interface element is a "click to talk" option, which may be displayed on the user-interface along with the other customer service options. Mobile device 102, depending on responses from data center 106, may provide the user-interface element. In an embodiment of the invention, the user-interface element is displayed based on one or more pre-defined conditions. The one or more pre-defined conditions may include, but are not limited to, the number of interactions that the customer has performed with the user-interface in a single session, the customer tier, the level of information requested by the customer through the user-interface, call center capacity, and the like. For example, if the customer is categorized as a premium customer, then data center 106 controls the mobile device 102 to display the user-interface element. However, in the case of a non-premium customer, until the customer completes a pre-defined limit of self-service interactions with the user-interface, the user-interface element is not displayed.

In an embodiment of the invention, upon selection of the user-interface element, the native application may utilize the global positioning application (e.g., GPS) of mobile device 102 and may select a contact number for a suitable customer call center 114 based on the customer's location and/or customer's preference. In various embodiments of the invention, integration with GPS data may avoid transferring the call to a fixed dial-in number irrespective to the customer's location. Thus, the native application may select the contact number of a territorial customer call center 114, based on the location information (from GPS data) of the customer. In an exemplary case, if a USA-abased customer is traveling in Germany, the native application will transfer the call to a Germany-based customer call center 114 instead of a USA-based customer call center 114. Moreover, since the native application also stores the customer's state information on mobile device 102, the native application may select the appropriate contact number based on one or more or the customer's preferences. The customer's preferences may include, but are not limited to, language preferences and the like.

In another embodiment of the invention, call center manager 118 may provide the user-interface element ("click to talk") on mobile device 102 depending on the real time capacity of call center 114. If the customer call center 114 is over capacity or unavailable, the user-interface element will not be displayed on mobile device 102. If the customer call center 114 is available, the user-interface element may be provided, depending on one or more pre-defined conditions. The selection of the user-interface element may prompt the native application to query mobile data center 106 for a contact number of customer call center 114 from call center manager 118. Call center manager 118 selects the contact number of the appropriate customer service agent 112 and communicates with the native application on mobile device 102 to place a call with customer service agent 112. In an embodiment of the invention, call center manager 118 selects the contact number of customer service agent 112 based at least in part on one or more criteria. The one or more criteria may include, but are not limited to, a location of mobile device 102, customer preference, call center capacity, and the like. Since, the customer's state information is stored on mobile device 102, the native application sends the location information of mobile device 102 and the stored state information to data center 106. The stored state information may include the customer's preferences, such as, but not limited to, language preferences and the like. Subsequently, call center manager 118 selects and acquires a contact number for customer service agent 112 based at least in part on the location information of mobile device 102 and one or more customer preferences. In the event that a contact number is not provided to the native application, a default contact number stored in the native application on mobile device 102 is used.

In an embodiment of the present invention, upon providing the user-interface element ("click to talk") on mobile device 102, call center manager 118 provides, on a continuous basis, approximate wait times for reaching a customer service agent 112. If a customer service agent 112 at customer call center 114 is not immediately available, the native application displays the approximate wait time on mobile device 102. The approximate wait time is continuously updated and displayed by the native application on mobile device 102. If the customer call center 114 becomes unavailable, the native application will instruct the customer to try again later.

In an embodiment of the invention, upon receiving the contact number from call center manager 118, mobile device 102 initiates a call to customer call center 114. Call center manager 118 synchronizes the call transfer with telecommunication network 110 to direct the call to the appropriate customer service agent 112. For example, based on the customer's state information, if it is known that the customer wishes to know the promotional offers on his or her credit cards, then data center 106 directs call center manager 118 to provide a phone number to mobile device 102, which then uses telecommunication network 110 to direct the call to a specific customer service agent 112, who can inform the customer about the promotional offers. Telecommunication network 110 may be a public switched telephone network (PSTN), which facilitates call signaling via traditional intelligent networks, such as a Signaling System 7 (SS7) call signaling network, as well as providing bearer channels for the actual voice call in a traditional circuit-switched fashion. Alternatively, telecommunication network 110 may be a packet switched network. The actual voice channel may be provided via the packet switched network via trunk gateways, which effectively interconnect the telephony switches and the packet switched network to provide the necessary conversion between circuit-switched voice and voice over packet communications over the packet switched network.

Thus, the customer is not required to go through a conventional IVR system and can be directly connected with the appropriate customer service agent 112. Moreover, in an embodiment of the invention, the native application also sends the stored state information to data center 106 through network 108, providing customer service agent 112 with the stored state information on agent desktop 116. After a customer has selected the user-interface element ("click to talk"), call center manager 118 synchronizes the customer's phone call with the correct customer service agent 112, who is provided with the customer's stored state information on agent desktop 116. The stored state information enables customer service agent 112 to acquire knowledge of the customer's interactions on the user-interface. This may help customer service agent 112 to resolve the customer's request efficiently and within a short period of time. Moreover, the native application may also send the customer identifiable information, and the customer account information which may be stored on the mobile device at the time of authenticating the password, to initiate the session.

In another embodiment of the invention, the native application sends the stored state information to mobile data server 104, which in turn sends the state information to data manager 120 of data center 106 over data network 108. Call center manager 118 synchronizes the call transfer with telecommunication network 110 to route the call to an appropriate customer service agent 112. Moreover, data center 106 also sends the stored state information from data manager 120 to customer service agent 112.

In various embodiments of the invention, if customer service agent 112 is busy, the call initiated from mobile device 102 may be directed to an IVR system. In an embodiment of the invention, the IVR system may provide a call back option to the customer.

In various other embodiments, system 100 may have one or more active customers at a given time with the customers using a plurality of mobile devices 102 to access the customer services using the user-interface on each of the plurality of mobile devices 102. Data center 106 is able to process the call transfers and send the state information in parallel to furnish a plurality of customer service agents 112 at customer call center 114 with customer state information while receiving the calls from the customers. Although system 100 shows telecommunication network 110 for handling the voice call, it will be apparent to a person ordinarily skilled in the art that data network 108 may replace telecommunication network 110 and can functionally perform the role of telecommunication network 110.

Figure 2A:
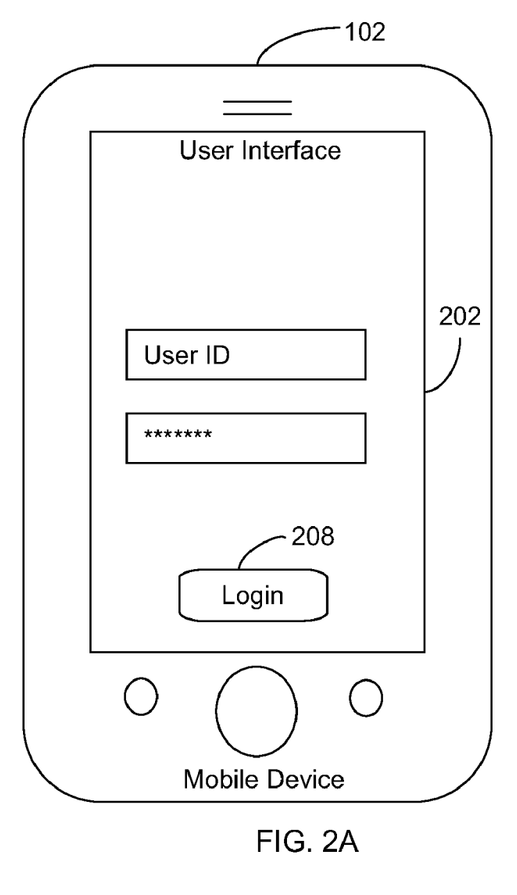
FIG. 2A is a schematic illustration of an exemplary implementation on a mobile device, according to one embodiment of the present invention.
Figure 2B:
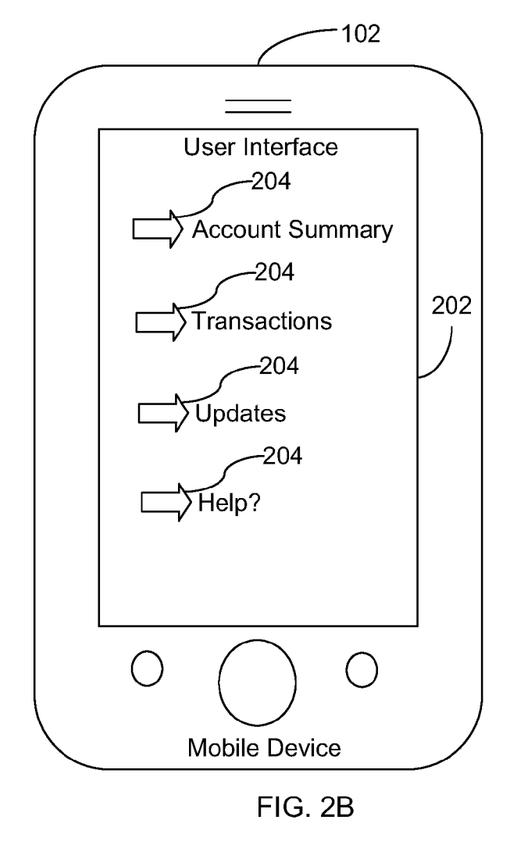
FIG. 2B is a schematic illustration of an exemplary implementation on a mobile device, according to another embodiment of the present invention.
Figure 2C:
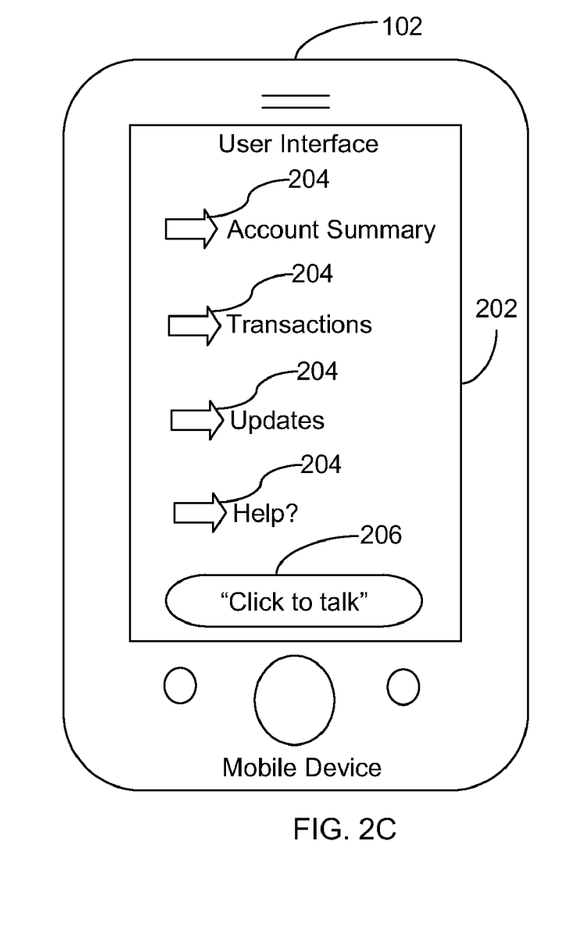
FIG. 2C is a schematic illustration of an exemplary implementation on a mobile device, according to another embodiment of the present invention.

FIGS. 2A, 2B, and 2C are schematic illustrations of an exemplary implementation of the native application on mobile device 102, according to one embodiment of the present invention. In an exemplary implementation, mobile device 102 is a smart phone, for example, a BlackBerry® device, an iPhone®, a Palm® device, or the like. Referring to FIG. 2A, the native application provides a user-interface 202 on mobile device 102, according to one embodiment of the invention. In an embodiment of the invention, to initiate a session of on mobile device 102, user-interface 202 shows an authentication screen for entering and/or speaking a customer ID and a password and a login button 208 to initiate the authentication process. The customer can provide the authentication information either through data (by keyboard) or through his or her voice by using automatic speech recognition capabilities of mobile device 102. In various other embodiments of the invention, the customer ID and password may include a unique combination of a customer's identifiable characteristics/authentication criterion, which is selected by the customer or provided by mobile data server 104 at the time of the registration process. In an embodiment of the invention, after entering or speaking the customer ID and/or the password the native application communicates with mobile data server 104 over data network 108 to authenticate the customer. Once the customer is authenticated, the customer's identifiable characteristics/authentication criterion can be retained on mobile device 102, thereby allowing the customer to bypass the authentication screen, if the customer chooses. The customer also has the option for mobile device 102 to retain only certain parts of the customer's identifiable characteristics/authentication criterion but still require the customer to enter or speak other information including the password.

FIG. 2B illustrates a schematic of mobile device 102 displaying user-interface 202 in accordance with an embodiment of the invention. After a successful authentication process, user-interface 202 may display one or more customer service options 204 on mobile device 102. In an exemplary embodiment, one or more customer service options 204 may include service provider specific information. For example, in the case of a credit card customer, customer service options 204 may include account summary, transaction, updates, help, and the like. Customer service options 204 may also include marketing information, customer notifications pushed by the credit card provider, pay by phone capabilities, and/or enrollment information. In response to the customer's interactions with customer service options 204, the native application on mobile device 102 interact with mobile data server 104 to retrieve corresponding information. The native application stores the interaction state information of the customer on mobile device 102.

FIG. 2C illustrates a schematic of mobile device 102 in accordance with an embodiment of the invention. In accordance with an embodiment, user-interface 202 may also display a "click to talk" option 206 along with customer service options 204. In an embodiment of the invention, "click to talk" option 206 may be displayed after a defined level of self-servicing performed by the customer or if other criterion are met. In response of exercising "click to talk" option 206, call center manager 118 provides, on a continuous basis, approximate wait times for reaching a customer service agent 112. If a customer service agent 112 at customer call center 114 is not immediately available, the native application displays the approximate wait time on mobile device 102. The approximate wait time is continuously updated and displayed by the native application on mobile device 102. If the customer call center 114 becomes unavailable, the native application will instruct the customer to try again later. Upon a customer service agent 112 becoming available, mobile device 102 initiates a call to customer call center 114 over telecommunication network 110. In accordance with an embodiment, the native application also sends the stored state information to agent desktop 116 for customer service agent 112.

III. Process

Figure 3:
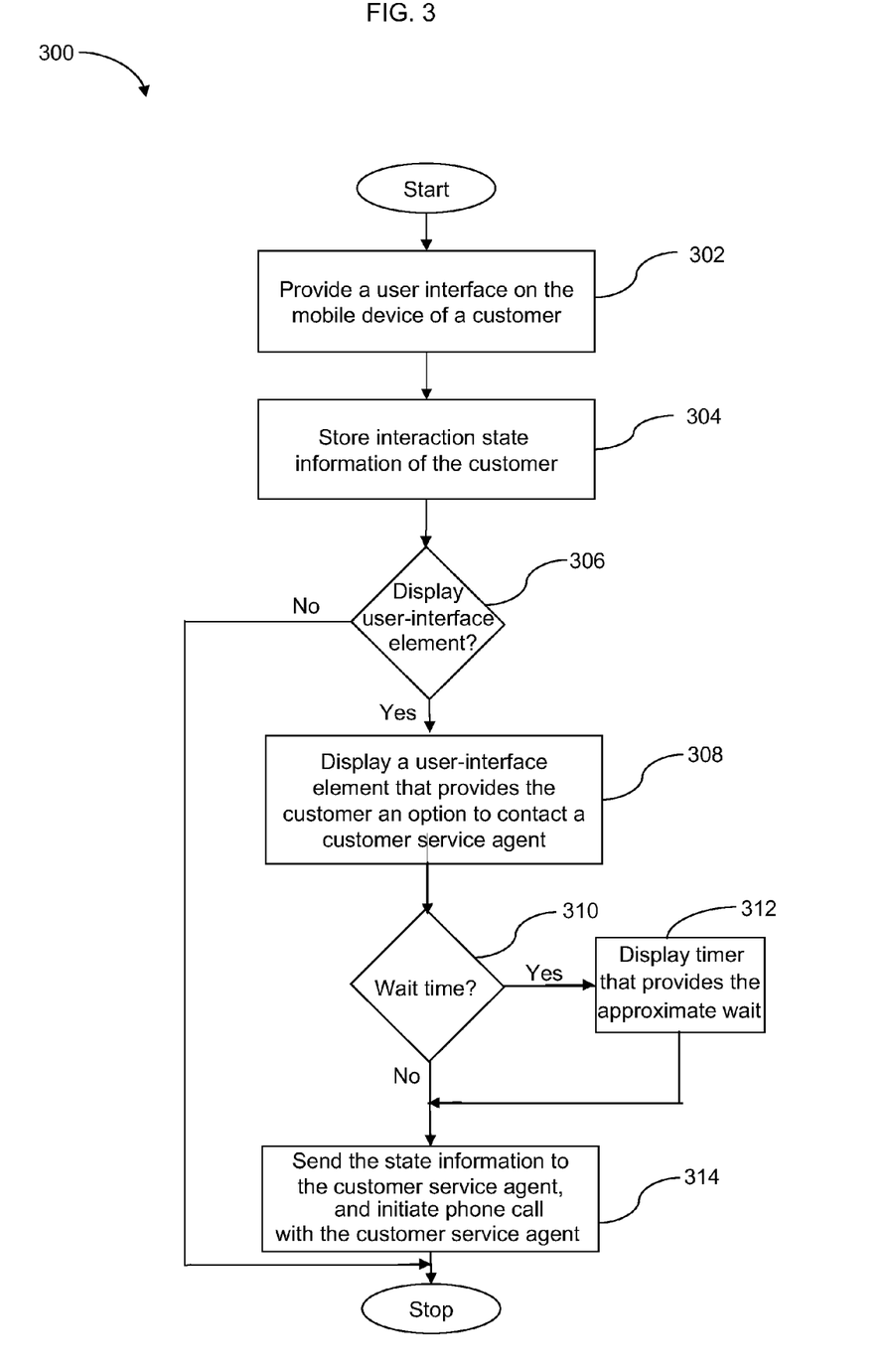
FIG. 3 is a flow chart illustrating an example process for providing customer service on a mobile device.

FIG. 3 is a flowchart illustrating an exemplary process 300 for providing customer support service on mobile device 102. In step S302, the native application provides a user-interface on mobile device 102 of the customer. In an embodiment of the invention, the native application may be downloaded from the service provider website or from a third party associated with the service provider. In an embodiment of the invention, the user-interface displays one or more interactive customer service options such as, but not limited to, account summary, transactions, updates, help, and many other options which may depend on the type of services/products offered by the service provider. In various embodiments, the native application may require an authentication process to display the user-interface on mobile device 102. The authentication process may require validating a customer based on a password provided by the customer to access the user-interface.

In step S304, the native application stores the customer state information on mobile device 102. The stored state information may include, but is not limited to, customer service options accessed by the customer, any assistance provided to the customer using the help section, the customer's attempts to access any specific information using the customer service option, and other similar interactions on the user-interface. Moreover, the stored state information on mobile device 102 also includes information associated with the response to the interactions.

In step S306, after data center 106 has received the customer's state information, mobile device 102 may provide the user-interface element, depending on responses from data center 106. The native application checks one or more predefined criteria before displaying the user-interface element on mobile device 102. The one or more pre-defined conditions may include, but are not limited to, the number of interactions that the customer has performed with the user-interface in a single session, the customer tier, the level of information requested by the customer through the user-interface, call center capacity, and the like. For example, if the customer has performed more than ten interactions and still has not resolved his queries, then the native application may display the user-interface element. In another example, if the customer is categorized in a premium customer category, then the native application displays the user-interface element immediately. If the customer has not met one or more of the pre-defined conditions, the user-interface element is not displayed. If the customer has met one or more of the pre-defined conditions, the user-interface element is displayed.

In step S308, the native application displays a user-interface element on the user-interface. The user-interface element provides the customer an option to contact a customer service agent 112 through customer call center 114. In an embodiment of the invention, the user-interface element is a "click-to-talk" option displayed on the user-interface. After the user-interface element is displayed on mobile device 102, the customer initiates the option to contact a customer service agent 112.

In step S310, call center manager 118 provides, on a continuous basis, approximate wait times for reaching a customer service agent 112. If a customer service agent 112 at customer call center 114 is not immediately available, the process proceeds to step S312. If a customer service agent 112 at customer call center 114 is immediately available, the process proceeds to step S314

In step S312, the native application displays the approximate wait time on mobile device 102. The approximate wait time is continuously updated and displayed by the native application on mobile device 102. When a customer service agent 112 becomes available, the process proceeds to step S314.

In step S314, the customer is put into contact with a customer service agent 112 through customer call center 114. The native application initiates the call on mobile device 102 and the data center 106 sends the stored state information to customer service agent 112.

Figure 4:
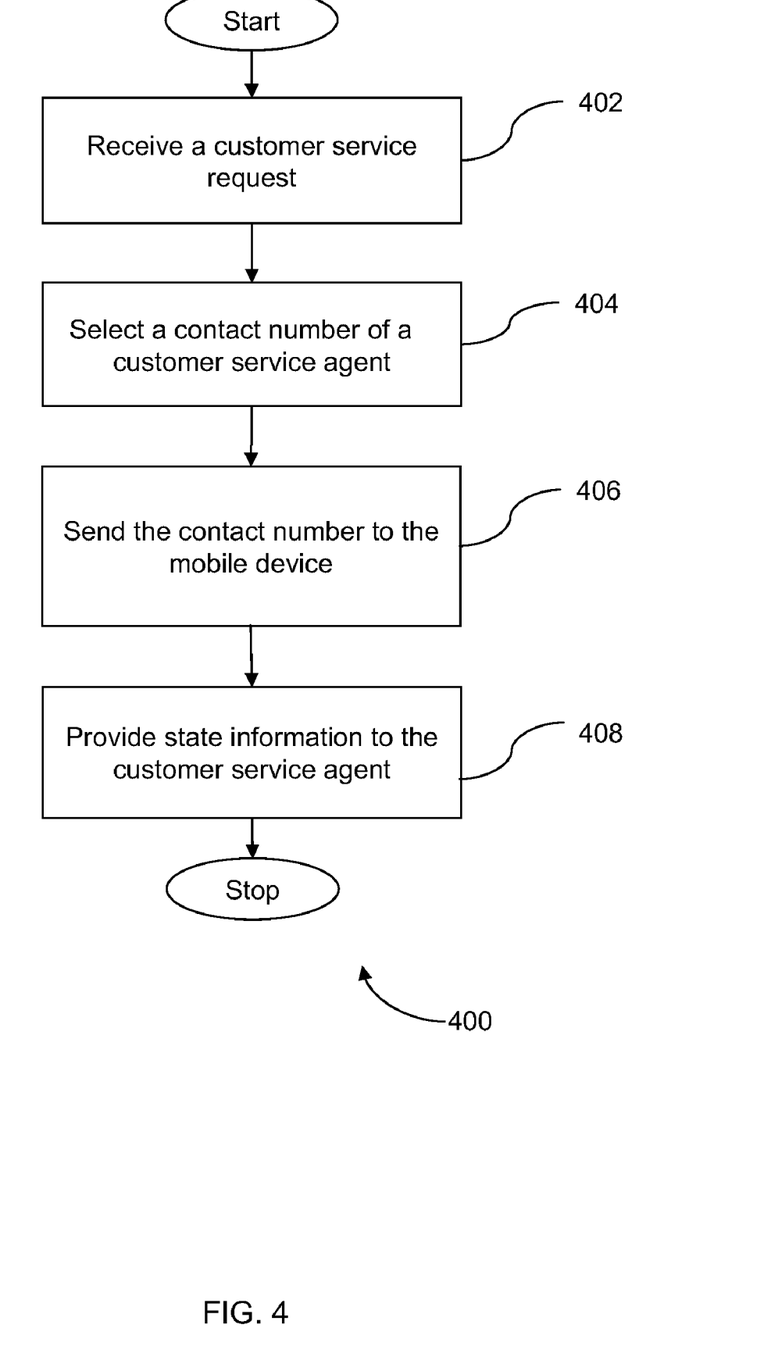
FIG. 4 is a flow chart illustrating another example process for providing customer service on a mobile device.

FIG. 4 is a flowchart illustrating another exemplary process 400 for providing customer service to the customer on mobile device 102. In an embodiment of the invention, the native application on mobile device 102 provides a user-interface. In an embodiment of the invention, data center 106 receives a request for the account information of the customer. Subsequently, data center 106 sends the account information of the customer to mobile device 102. Based on the account information, the native application displays the user-interface on mobile device 102. The user-interface displays one or more interactive customer service options based on the account information of the customer. The customer may interact with the user-interface to view one or more details associated with his or her account. The native application stores the customer's state information, which includes details of the customer's interaction on the user-interface.

In an embodiment of the invention, the native application may interact with data center 106 to display a user-interface element on the user-interface. The user-interface element provides the customer an option to contact customer service agent 112. In step S402, data center 106 receives the customer service request from mobile device 102 of the customer. In an embodiment of the invention, the customer service request includes the exercising of the user-interface element by the customer.

In step S404, call center manager 118 dynamically selects a contact number of customer service agent 112. Call center manager 118 selects the contact number based at least in part on at least one of the geographical location of mobile device 102 and a customer preference, such as a language preference of the customer. Moreover, the native application sends the stored state information of the customer to data center 106. Data center 106 stores the state information to data manager 120 and may utilize it in selecting a contact number of customer service agent 112. If call center manager 118 is unable to select a contact number, a default contact number stored on mobile device 102 is selected.

In step S406, data center 106 sends the selected contact number to mobile device 102 or the default contact number is used. In an embodiment of the invention, mobile device 102 initiates the call with customer call center 114 to customer service agent 112 through telecommunication network 110.

In step S408, in response to a notification of the call to customer service agent 112, mobile device 102 provides state information to data center 106 over data network 108. Call center manager 118 synchronizes the call transfer with telecommunication network 110 to appropriately route the call to customer service agent 112. Moreover, data center 106 also sends the state information to customer service agent 112 via agent desktop 116.

IV. Example Implementations

The present invention (i.e., system 100, process 300, and process 400 or any part(s) or function(s) thereof) may be implemented using hardware, software, or a combination thereof, and may be implemented in one or more computer systems or other processing systems. However, the manipulations performed by the present invention were often referred to in terms, such as comparing or checking, which are commonly associated with mental operations performed by a human operator. No such capability of a human operator is necessary, or desirable in most cases, in any of the operations described herein, which form a part of the present invention. Rather, the operations are machine operations. Useful machines for performing the operations in the present invention may include general-purpose digital computers or similar devices.

Figure 5:
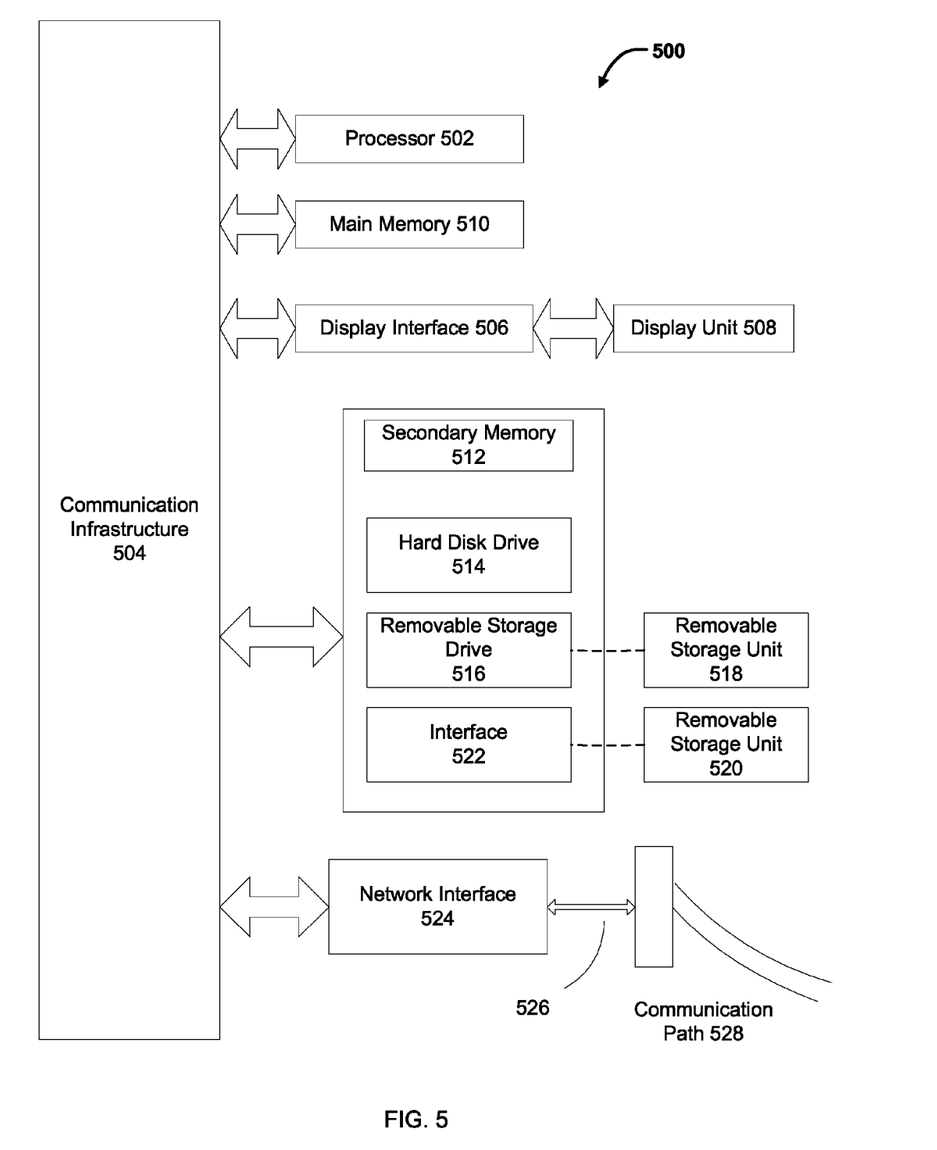
FIG. 5 is a block diagram of an exemplary computer system for implementing the present invention.

In fact, in accordance with an embodiment, the present invention is directed towards one or more computer systems capable of carrying out the functionality described herein. An example of the computer systems includes a computer system 500, which is shown in FIG. 5.

Computer system 500 includes at least one processor, such as a processor 502. Processor 502 is connected to a communication infrastructure 504, for example, a communications bus, a cross-over bar, a network, and the like. Various software embodiments are described in terms of this exemplary computer system 500. After reading this description, it will become apparent to a person skilled in the relevant art(s) how to implement the present invention using other computer systems and/or architectures.

Computer system 500 includes a display interface 506 that forwards graphics, text, and other data from communication infrastructure 504 (or from a frame buffer which is not shown in FIG. 5) for display on a display unit 508.

Computer system 500 further includes a main memory 510, such as random access memory (RAM), and may also include a secondary memory 512. Secondary memory 512 may further include, for example, a hard disk drive 514 and/or a removable storage drive 516, representing a floppy disk drive, a magnetic tape drive, an optical disk drive, etc.

Removable storage drive 516 reads from and/or writes to a removable storage unit 518 in a well known manner. The removable storage unit 518 may represent a floppy disk, magnetic tape, or an optical disk and may be read by and written to by removable storage drive 516. As will be appreciated, removable storage unit 518 includes a computer usable storage medium having stored therein computer software and/or data.

In accordance with various embodiments of the present invention, secondary memory 512 may include other similar devices for allowing computer programs or other instructions to be loaded into computer system 500. Such devices may include, for example, a removable storage unit 520, and an interface 522. Examples of such may include a program cartridge and a cartridge interface (such as that found in video game devices), a removable memory chip (such as an erasable programmable read only memory (EPROM) or programmable read only memory (PROM)) and an associated socket, and other removable storage units 520 and interfaces 522, which allow software and data to be transferred from removable storage unit 520 to computer system 500.

Computer system 500 may further include a communication interface 524. Communication interface 524 allows software and data to be transferred between computer system 500 and external devices. Examples of communication interface 524 include, but may not be limited to a modem, a network interface (such as an Ethernet card), a communications port, a Personal Computer Memory Card International Association (PCMCIA) slot and card, and the like. Software and data transferred via communication interface 524 are in the form of a plurality of signals, hereinafter referred to as signals 526, which may be electronic, electromagnetic, optical, or other signals capable of being received by communication interface 524. Signals 526 are provided to communication interface 524 via a communication path (e.g., channel) 528. Communication path 528 carries signals 526 and may be implemented using wire or cable, fiber optics, a telephone line, a cellular link, a radio frequency (RF) link, and other communication channels.

In this document, the terms "computer program medium" and "computer readable medium" are used to generally refer to media such as removable storage drive 516, a hard disk installed in hard disk drive 514, signals 526, and the like. These computer program products provide software to computer system 500. The present invention is directed to such computer program products.

Computer programs (also referred to as computer control logic) are stored in main memory 510 and/or secondary memory 512. Computer programs may also be received via communication infrastructure 504. Such computer programs, when executed, enable computer system 500 to perform the features of the present invention, as discussed herein. In particular, the computer programs, when executed, enable processor 502 to perform the features of the present invention. Accordingly, such computer programs represent controllers of computer system 500.

In accordance with an embodiment of the invention, where the invention is implemented using software, the software may be stored in a computer program product and loaded into computer system 500 using removable storage drive 516, hard disk drive 514, or communication interface 524. The control logic (software), when executed by processor 502, causes processor 502 to perform the functions of the present invention as described herein.

In another embodiment, the present invention is implemented primarily in hardware using, for example, hardware components such as application specific integrated circuits (ASIC). An implementation using hardware to perform the functions described herein will be apparent to persons skilled in the relevant art(s).

In yet another embodiment, the present invention is implemented using a combination of both the hardware and the software.

V. Conclusion

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

We claim:

1. A method comprising:
providing, by a computer-based system for providing customer service on a mobile device of a customer, a user-interface on the mobile device of the customer, wherein the user-interface displays one or more interactive customer service options;
storing, by the computer-based system, interaction state information of the customer's interaction with the user-interface;
displaying, by the computer-based system, a user-interface element that provides the customer an option to contact a customer service agent, wherein the displaying the user-interface element includes:
checking that a pre-defined condition for the display of the user-interface element is met, wherein checking the pre-defined condition includes one or more of checking the number of interactions that the customer has performed with the user-interface, and checking a customer tier of the customer; and
displaying the user-interface element in response to the pre-defined condition being met; and
sending, by the computer-based system, the stored state information to the customer service agent in response to the customer exercising the option to contact the customer service agent.

2. The method of claim 1, further comprising querying a mobile data server for a contact number of the customer service agent.

3. The method of claim 2, further comprising sending location information of the mobile device to the mobile data server.

4. The method of claim 2, further comprising placing a call to the contact number of the customer service agent.

5. The method of claim 1, further comprising selecting a contact number of the customer service agent from plural contact numbers based at least in part on one or more of the following criteria: a location of the mobile device; and a customer preference.

6. A computer program product comprising a non-transitory computer readable storage medium having control logic stored therein to be performed on at least one processor for providing customer service on a mobile device of a customer, the control logic comprising:
 user-interface computer readable program code for providing a user-interface on the mobile device of the customer, wherein the user-interface displays one or more interactive customer service options;
 storing computer readable program code for storing interaction state information of the customer's interaction with the user-interface;
 displaying computer readable program code for displaying a user-interface element that provides the customer an option to contact a customer service agent, wherein displaying the user-interface element includes:
  checking that a pre-defined condition for the display of the user-interface element is met, wherein checking the pre-defined condition includes one or more of checking the number of interactions that the customer has performed with the user-interface, and checking a customer tier of the customer; and
  displaying the user-interface element in response to the pre-defined condition being met; and
 sending computer readable program code for sending the stored state information to the customer service agent in response to the customer exercising the option to contact the customer service agent.

7. The computer program product of claim 6, wherein the control logic further comprises querying computer readable program code for querying a mobile data server for a contact number of the customer service agent.

8. The computer program product of claim 7, wherein the control logic further comprises location computer readable program code for sending the mobile data server location information of the mobile device.

9. The computer program product of claim 7, wherein the control logic further comprises calling computer readable program code for placing a call to the contact number of the customer service agent.

10. The computer program product of claim 6, wherein the control logic further comprises selecting computer readable program code for selecting a contact number of the customer service agent based at least in part on one or more of the following criteria: a location of the mobile device; and a language preference of the customer.

11. A system of providing customer service to a customer, the system comprising:
 a mobile device of a customer provided with a user-interface, wherein the user-interface displays a user-interface element that provides the customer an option to contact a customer service agent, wherein displaying the user-interface element includes:
  checking that a pre-defined condition for the display of the user-interface element is met, wherein checking the pre-defined condition includes one or more of checking the number of interactions that the customer has performed with the user-interface, and checking a customer tier of the customer; and
  displaying the user-interface element in response to the pre-defined condition being met;
 a mobile data server capable of sending and receiving customer service information to and from the mobile device of the customer;
 a network for providing data communication between the mobile device of the customer and the mobile data server; and
 a telecommunication network for providing voice communication between the mobile device of the customer and a customer service agent, wherein the mobile device sends interaction state information of the customer's interaction with the user-interface to the customer service agent over the network in response to the customer exercising an option to contact the customer service agent over the telecommunication network.

12. The system of claim 11, wherein the mobile device is configured to query the mobile data server for a contact number of the customer service agent.

13. The system of claim 12, wherein the mobile device is configured to send location information of the mobile device to the mobile data server.

14. The system of claim 12, wherein the mobile device is configured to place a call to the contact number of the customer service agent.

15. The system of claim 11, wherein the mobile device is configured to select a contact number of the customer service agent from plural contact numbers based at least in part on one or more of the following criteria: a location of the mobile device; and a customer preference.

* * * * *